Figure 1:
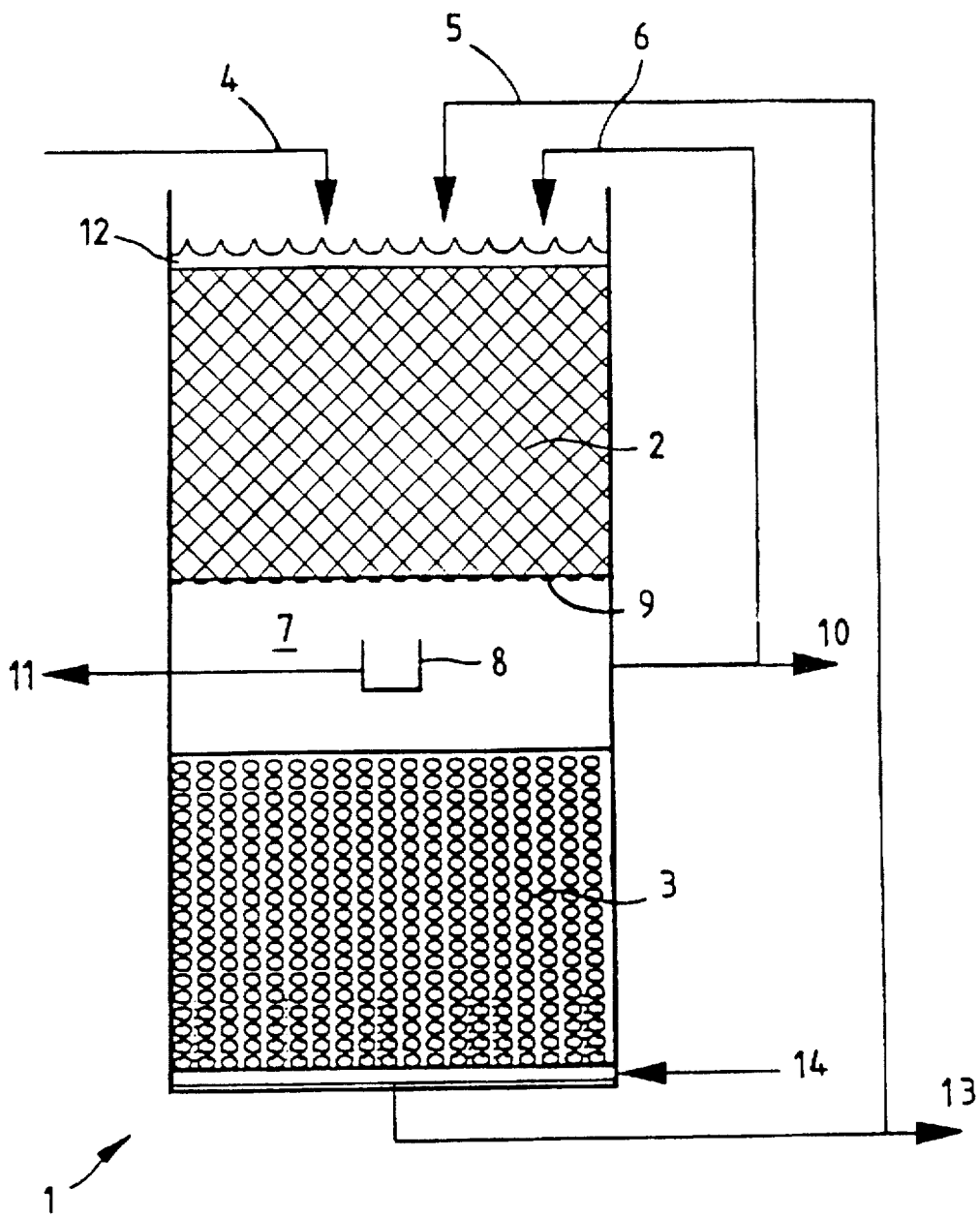

United States Patent [19]

Smith

[11] Patent Number: 5,800,709

[45] Date of Patent: Sep. 1, 1998

[54] BIOLOGICAL AERATED FILTERS

[75] Inventor: Alan James Smith, Hemel Hempstead, England

[73] Assignee: Thames Water Utilities Limited, Reasling, England

[21] Appl. No.: 716,291

[22] PCT Filed: Mar. 23, 1995

[86] PCT No.: PCT/GB95/00651

§ 371 Date: Dec. 2, 1996

§ 102(e) Date: Dec. 2, 1996

[87] PCT Pub. No.: WO95/25695

PCT Pub. Date: Sep. 28, 1995

[30] Foreign Application Priority Data

Mar. 24, 1994 [GB] United Kingdom ............... 9405871

[51] Int. Cl.$^6$ .................... C02F 3/04; C02F 3/06
[52] U.S. Cl. ............ 210/617; 210/630; 210/807; 210/151; 210/284
[58] Field of Search .................... 210/617, 605, 210/615, 616, 620, 630, 792, 793, 807, 150, 151, 264, 275, 284, 285

[56] References Cited

U.S. PATENT DOCUMENTS 4,925,552  5/1990  Bateson et al. ............... 210/150
5,422,020  6/1995  Tylmann et al. ............... 210/807
5,525,230  6/1996  Wrigley et al. ............... 210/150
5,573,671  11/1996  Klein ............................. 210/792
5,618,430  4/1997  Fuchs ............................ 210/616

FOREIGN PATENT DOCUMENTS 524794   1/1993  European Pat. Off.
2624847  6/1989  France
91/03429 3/1991  WIPO

*Primary Examiner*—Thomas G. Wyse
*Attorney, Agent, or Firm*—Alix, Yale & Ristas, LLP

[57] ABSTRACT

The invention relates to apparatus (1) in the form of a treatment vessel comprising a high voidage media bed (2) situated above a low voidage granular media bed (3). Fluid (4) to be treated, combined with an effluent recycle flow stream (5) and intermediate recycle flow stream (6) as appropriate, flows down through the flooded aerated high voidage media (2), through an intermediate section (7) containing a collector in the form of a trough (8) and down through the aerated packed bed of granular media (3). The trough (8) is known as a washout trough. The high voidage media is supported on a support means such as a grille or grid (9). During a cycle any surplus treated water passes out of the intermediate section (7 at 10), while backwash liquors pass out of the vessel at (11). The usual operating level of the liquid in the vessel is shown at (12), treated liquor or effluent passing out of the vessel at (13). Process air passes into the vessel (1 at 14).

21 Claims, 3 Drawing Sheets

BIOLOGICAL AERATED FILTERS

The invention relates to a method of construction and operation of Biological Aerated Filters, usually flooded, in the treatment of fluids, particularly domestic and industrial waste-waters, typically for the removal of suspended solids, biochemical oxygen demand (BOD), ammoniacal nitrogen and total nitrogen.

The biological aerated flooded filter typically comprises a submerged bed of inert packing on which the micro-organisms responsible for treatment are attached. The waste-water to be treated flows up or down through the packed bed and air, oxygen enriched air, oxygen, or other gases are introduced at or near the base of the bed. As the treatment proceeds, the packed bed becomes blocked with the growth of micro-organisms and the capture of suspended solids causing a resistance to the fluid flow. When this resistance to flow, or head loss, reaches a predetermined level or at a preset time, the filter must be washed. The filter is washed using a combination of air, to scour the media, and water to carry away the surplus biomass and captured solids. The rate of headloss development and efficiency of filter washing are critical to the operation and performance of biological aerated flooded filters.

Typically, suspended solids, biochemical oxygen demand and ammoniacal nitrogen are removed in the aerated filter. The process of ammonia removal produces the nitrate ion which is discharged in the effluent. Nitrate is nutrient for biological growth and problems with eutrophication have led to a requirement for nitrate removal in the process. If the treated effluent is recycled to an un-aerated section of the packed bed the bacteria responsible for the removal of BOD will utilise the oxygen bound up in the nitrate ion, releasing nitrogen gas into the atmosphere and reducing the level of nitrate discharged in the final effluent. This process is known as denitrification and is typically carried out in a separate treatment vessel.

In a prior biological aerated flooded filter, there is a packed bed comprising small granular media sized typically between 2 and 6 mm, the depth of the packed media bed being typically 1.5 to 2.5 meters. As described, air or other gas in introduced through coarse sparge pipes or diffusers at or near the base of the filter. The transfer efficiency of oxygen or other gases from the gas to the liquid phase is dependent on, amongst other things, the depth of water above the aeration device. Oxygen transfer efficiency can be improved by increasing the depth of the submerged packed bed, however this has the disadvantage of increasing the hydraulic loading rate, in terms of waste-water flow per unit surface area, increasing the rate of headloss development, and increasing backwash air and water flow rates needed to clean the deeper filter bed. This means that a granular media biological aerated flooded filter with a bed depth greater than typically 2.5 m, will require backwashing more often, with a higher energy and cost requirement per wash.

The headloss across the packed bed is dependent on the depth of the packed media bed, the size and angularity of the individual media particles, the waste-water flow and applied pollution load, the biodegradability of the pollution load and the growth rate of the attached biomass. If the packed bed comprises media grains of too small a size the headloss development during operation will be excessive and frequent washing of the bed will be required. Similarly, if the media has been sized correctly and excessively high flows are experienced the packed bed can be subject to premature headloss development causing the bed to block.

An advantage of small granular media as described is seen in the large surface area available for the growth of the bacteria and micro-organisms responsible for treatment. This leads to high concentrations of attached biomass and hence much smaller reactor volumes can be used. In addition physical and biological filtration are accomplished within the packed media bed resulting in treatment and solids removal in a single treatment vessel.

In another biological aerated flooded filter high voidage media is used in the packed bed to support the attached biomass. This media can be constructed from plastic or other material as rigid structures or randomly packed individual particles. Although the surface area of the media available to support the growth of the biomass can be varied it is typically much smaller than that available with the smaller granular media and more media is required to produce an equivalent effluent quality. In addition, the high voidage does not allow the packed filter bed to filter out suspended solids contained in the waste-water, or removed from the support media by the fluid flow and additional treatment is required to achieve low suspended solid residuals in the final effluent.

Such a biological aerated flooded filter is typically 3–6 meters deep giving a higher hydrostatic pressure and greater oxygen transfer. In addition the high media voidage makes the packed bed less likely to block with excessive short term fluctuations in flow and load.

It is accordingly the object of the invention to seek to overcome the disadvantages of prior biological aerated flooded filters.

According to one aspect of the invention there is provided apparatus for treating a liquid, suitably waste-water, comprising a plurality of filter beds in series, such as being placed one on top of the other, the filter media of each bed having surfaces for the attachment of bacteria and microorganisms responsible for treatment of the liquid.

The filter bed media will suitably differ in their respective voidages such that the waste-water to be treated flows initially through the highest voidage media, with each media voidage decreasing in the direction of the fluid flow.

The different media types may be in contact with each other or separated by a suitable distance and may be supported on structures within a treatment vessel comprising part of the apparatus.

There may be provided a suitable device or plurality of devices, typically backwash launders, to remove dirty backwash water from media interface levels in the treatment vessel, so that the media beds may be washed independently or so that the media positioned lower in the treatment vessel may be washed independently of the media higher up the treatment vessel.

The fluid to be treated can flow downwards, upwards or horizontally through the treatment vessel.

Also, the filter bed may be flooded, partially flooded or unflooded.

Air, oxygen enriched air, oxygen or other gas required for treatment is introduced at the base (in use) of the treatment vessel, substantially across the whole of the filter floor, using suitable supply means such as diffusers, sparge pipework or other suitable devices.

The gas supply may be continuous across the whole of the filter floor, intermittent across the whole of the filter floor or intermittent to portions of the total filter floor area in rotation. The gas will flow upwards through all the media beds or be removed by a suitable device or plurality of devices such that media higher up in the treatment vessel may be operated with or without the gas supply.

A device or devices may also be provided to recycle the flow from the base or top of the treatment vessel, or from intermediate points within the treatment vessel, to the top or bottom or some intermediate point in the treatment vessel or to some other treatment system.

Figure 2:
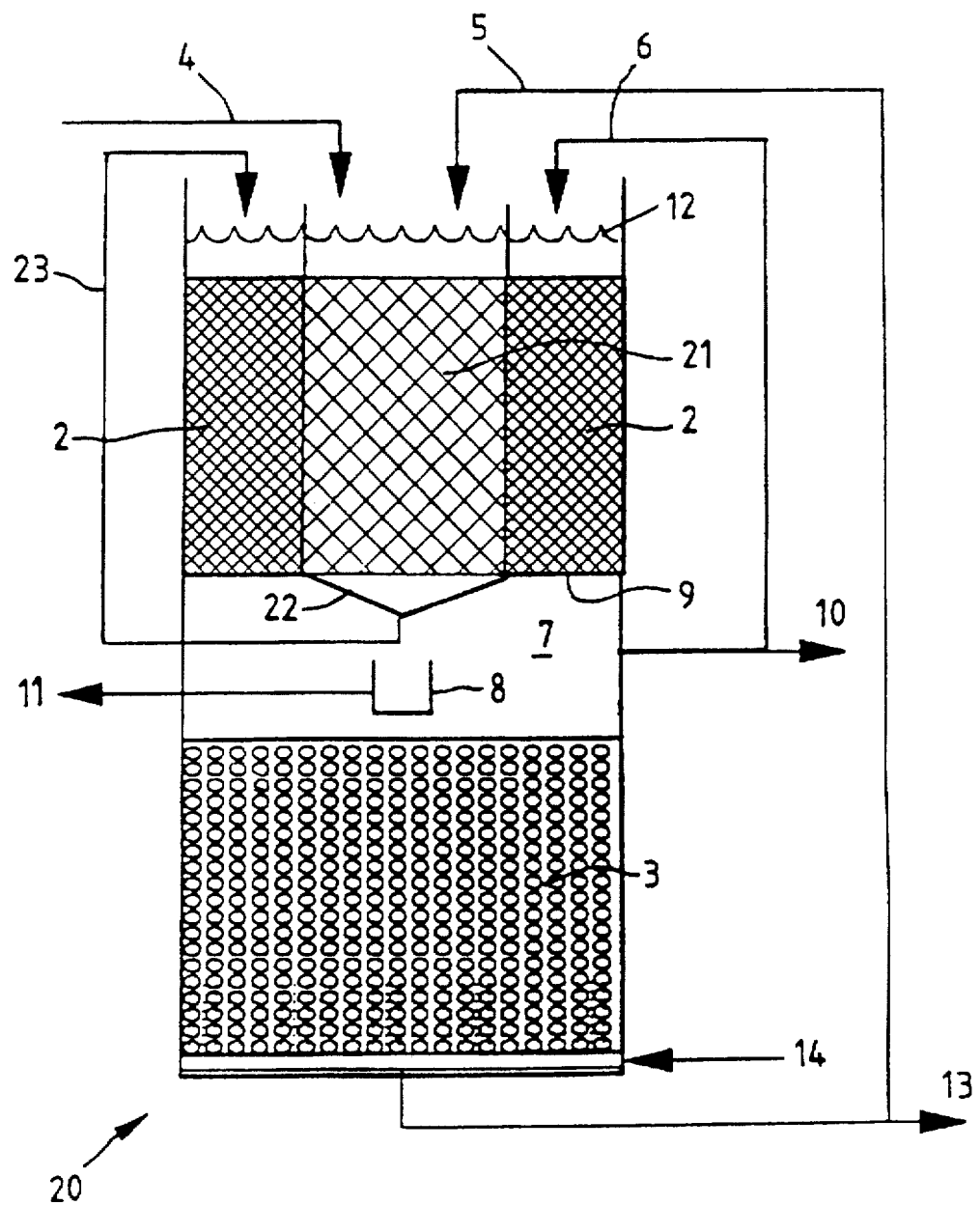
Figure 3:
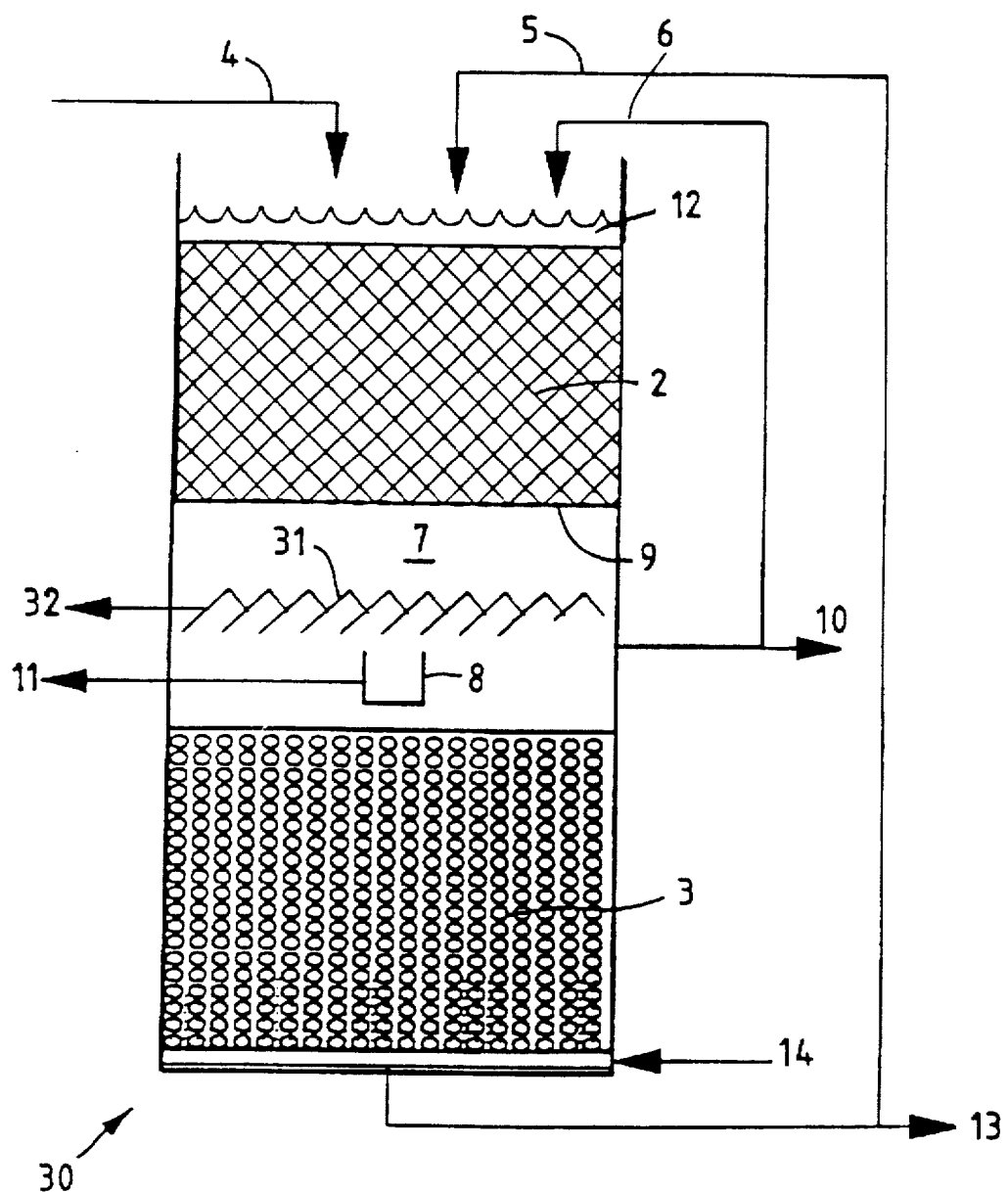

Apparatus for treating a liquid such as waste-water is diagrammatically illustrated by way of example in the accompanying drawings, in which FIGS. 1, 2 and 3 show schematically side elevations of apparatus for fluid treatment indicating methods of operation according to the invention.

Referring to the drawings in which like parts are indicated by like numerals, FIG. 1, shows apparatus I in the form of a treatment vessel comprising a high voidage media bed 2 situated above a low voidage granular media bed 3. Fluid 4 to be treated, combined with an effluent recycle flow stream 5 and intermediate recycle flow stream 6 as appropriate, flows down through the flooded aerated high voidage media 2, through an intermediate section 7 containing a collector in the form of a trough 8 and down through the aerated packed bed of granular media 3. The trough 8 is known as a washout trough.

The high voidage media is supported on a support means such as a grille or grid 9. During a cycle any surplus treated water passes out of the intermediate section 7 at 10, while backwash liquors pass out of the vessel at 11. The usual operating level of the liquid in the vessel is shown at 12, treated liquor or effluent passing out of the vessel at 13. Process air passes into the vessel 1 at 14.

During a wash cycle of the media 2, 3, in one method of operation, the high voidage media 2 is drained down to a level below the washout trough 8 prior to the commencement of the wash. Only the granular media bed 3 is subjected to combined air and water wash. In other methods of operation the high voidage media 2 is subject to an air scour prior to draining or both media 2, 3 are washed at the same time.

Referring now to FIG. 2, there is shown a treatment vessel 20 comprising a combination of a flooded anoxic packed media bed 21 and aerated high voidage media 2 situated above an aerated low voidage granular media bed 3. The fluid 4 to be treated, combined with the effluent recycle flow stream 5 passes down through the anoxic packed bed 21 which is separated from the lower (as viewed) aerated portion of the treatment vessel by a trough 22 in intermediate section 7. The flow exits the base of the anoxic filter 21 and is recycled at 23 to the top of the aerated high voidage media 2 passing down through it, into and through the aerated packed bed. During the wash cycle both anoxic and aerated filters can be drained via the washout trough 8 prior to washing the lower granular media bed.

The high voidage media bed 2 is toroidal and surrounds the packed media bed 21.

Referring now to FIG. 3, there is shown a treatment vessel 30 comprising a flooded high voidage anoxic media bed 2 which is not aerated, situated above an aerated granular packed bed 3. The fluid 4 to be treated, and the effluent recycle 5 flow into the top (as viewed) of the vessel and down through the anoxic media bed 2 thence down into the aerated granular media bed 3. Treated effluent flows from the base of the vessel with a percentage of the flow recycled at 5 to the top of the vessel 30. An air removal system 31 such as diffuser plates or lamella plates in section 7 captures the process air exiting the top of the aerated granular packed bed 3 and is vented at 32 from the treatment vessel 30 so that the high voidage media bed 2 remains unaerated.

The washout trough 8, which extends over the width of the apparatus in intermediate section 7 in the illustrated embodiment, is used in the washing cycle in all embodiments. Essentially, during washing, the vessel 1, 20 or 30 is drained down so the liquid level falls below the trough 8. The high voidage media 2, being high voidage, that is with large intergranular spacing, is such that it does not require specific backwashing. The media 2 stays "clean". However, the packed media bed 3 has closely packed media or granules which do need cleaning of trapped debris etc. Thus backwashing of bed 3 is necessary. To accomplish this action, backwashing liquid (water usually) is passed up through the bed 3 from below, to the level of or just above the level of the trough 8 so that backwash liquors carrying debris, sediment etc. flow over the edges of the trough into the trough, and thence away at 11 to a balancing tank (not shown) thence to a primary sedimentation process where the debris or sediment separates from the liquors, which are then returned to the filter vessel 1, 20 or 30 via 4 to be treated.

It will be understood that a process and apparatus embodying the invention may have the following features:

1. A process for treating fluids comprising a treatment vessel, or plurality of treatment vessels, containing a number of filter beds with the surfaces of the media comprising the filter beds supporting attached microorganisms for the treatment of fluid.
2. A process in which the media comprising the filter beds are of different voidage.
3. A process in which the lower voidage media forming a filter bed are granular and aerated.
4. A process in which the higher voidage media forming a filter bed are granular or structured.
5. A process in which the higher voidage media forming a filter bed are aerated or unaerated.
6. A process in which the fluid to be treated flows through the filter beds within the treatment vessel in the direction of decreasing filter bed media voidage.
7. A process in which the filter beds may be flooded.
8. A process in which the filter beds may be partially flooded.
9. A process in which the filter beds may be in contact with each other within the treatment vessel.
10. A process in which the filter beds may be separated from each other within the treatment vessel.
11. A process in which the filter beds in the treatment vessel may be washed together.
12. A process in which the filter beds in the treatment vessel may be washed independently of each other.

Thus, using the invention, it is possible:

i) to overcome the problems of excessive headloss development within the packed bed of the biological aerated flooded filter using small granular media, typically between 1.5 mm and 6 mm, in a deep bed, typically over 2 m.

ii) to improve the oxygen transfer in biological aerated flooded filters by constructing and operating the filter with a greater hydrostatic pressure, typically 4 m.

iii) to solve the problem of excessive suspended solids in the effluent from biological aerated flooded filters with the packed bed constructed from high voidage media.

iv) to obtain nitrification and denitrification in a single treatment vessel.

I claim:

1. A process for treating fluid in a biological aerated filter, comprising passing the fluid serially through superposed upper and lower filter beds, the lower filter bed comprising aerated media and the upper filter bed being substantially anoxic, wherein oxygen is prevented from moving from the lower bed to the upper bed.

2. A process according to claim 1, wherein the fluid is passed through filter beds comprising media of different voidage.

3. A process according to claim 1, wherein the lower bed comprises granular media.

4. A process according to claim 3, wherein the upper filter bed is granular or structured.

5. A process according to claim 1, the fluid to be treated flowing through the filter beds in a direction of decreasing filter bed media voidage.

6. A process according to claim 1, the filter beds being flooded.

7. A process according to claim 1, the filter beds being partially flooded.

8. A process according to claim 1, the filter beds being in contact with each other within a treatment vessel.

9. A process according to claim 1, the filter beds being separated from each other within a treatment vessel.

10. A process according to claim 1, the filter beds being washed together.

11. A process according to claim 1, the filter beds being washed independently of each other.

12. Apparatus for biological aerated filter treatment of fluids, comprising superposed upper and lower filter beds, the lower filter bed comprising aerated media and the upper filter bed being substantially anoxic, the apparatus further comprising separator means for preventing oxygen from the aerated media from passing to the anoxic media.

13. Apparatus according to claim 12, wherein the separator means comprises diffuser plates or lamella plates.

14. Apparatus according to claim 13, the upper filter bed comprising relatively high voidage media and the lower filter bed comprising relatively packed media.

15. Apparatus according to claim 14, including an intermediate space between the filter beds.

16. Apparatus according to claim 15, there being means to collect backwash liquors in the intermediate space.

17. Apparatus according to claim 16, there being backwash means for passing backwash liquors through the lower filter bed towards the collection means.

18. Apparatus according to claim 17, the collection means comprising a trough extending across the apparatus.

19. Apparatus according to claim 14, the upper filter bed comprising an anoxic packed filter and a high voidage media.

20. Apparatus according to claim 19, the anoxic packed filter being surrounded by the high voidage media, and separate therefrom.

21. Apparatus according to claim 20, there being a separate collector for liquor from the anoxic packed filter in the intermediate section.

* * * * *